United States Patent
Tseng et al.

(10) Patent No.: US 11,627,038 B2
(45) Date of Patent: Apr. 11, 2023

(54) MINI-LOGS TRANSFORMATION FOR LIGHT-WEIGHT INTELLIGENT CONTROL PLANE

(71) Applicant: Nokia Solutions and Networks Oy, Espoo (FI)

(72) Inventors: Yuchia Tseng, Massy (FR); Gopalasingham Aravinthan, Savigny Surorge (FR); Bogdan Uscumlic, Les Ulis (FR)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 17/026,421

(22) Filed: Sep. 21, 2020

(65) Prior Publication Data

US 2022/0094587 A1   Mar. 24, 2022

(51) Int. Cl.
*H04L 41/069* (2022.01)
*H04L 41/0816* (2022.01)

(52) U.S. Cl.
CPC ........ *H04L 41/069* (2013.01); *H04L 41/0816* (2013.01)

(58) Field of Classification Search
CPC .......................... H04L 41/069; H04L 41/0816
See application file for complete search history.

(56) References Cited

U.S. PATENT DOCUMENTS

| | | | | |
|---|---|---|---|---|
| 7,778,979 | B2 * | 8/2010 | Hatonen | G06F 21/552 |
| | | | | 707/693 |
| 10,691,728 | B1 | 6/2020 | Masson et al. | |
| 2008/0319940 | A1 * | 12/2008 | Garg | H04L 12/66 |
| 2013/0179821 | A1 * | 7/2013 | Bauer | G06F 3/0631 |
| | | | | 715/772 |
| 2016/0292592 | A1 | 10/2016 | Patthak et al. | |
| 2018/0239682 | A1 * | 8/2018 | Kaluza | G06F 11/3006 |
| 2018/0270262 | A1 | 9/2018 | Zhang et al. | |
| 2019/0050747 | A1 * | 2/2019 | Nakamura | G06F 30/20 |
| 2019/0182101 | A1 | 6/2019 | Kulshreshtha et al. | |

OTHER PUBLICATIONS

Extended European Search Report dated Jan. 31, 2022 in European Application No. 21193048.

* cited by examiner

*Primary Examiner* — Sm A Rahman
(74) *Attorney, Agent, or Firm* — Harness, Dickey & Pierce, P.L.C.

(57) ABSTRACT

A network node generates a reduced size textual network log by including a set of numerical values for a log entry within a textual network log for a network, the log entry constituting an instance of a recognizable pattern within the textual network log; and then outputs the reduced size textual network log to a network controller for configuring the network.

17 Claims, 4 Drawing Sheets

MINI-LOGS TRANSFORMATION FOR LIGHT-WEIGHT INTELLIGENT CONTROL PLANE

BACKGROUND

Network logs include information about software execution/updates at points in a network, and may serve as a tool for building a control plane in a network.

SUMMARY

The scope of protection sought for various embodiments of the invention is set out by the independent claims. The example embodiments and/or features, if any, described in this specification that do not fall under the scope of the independent claims are to be interpreted as examples useful for understanding various embodiments.

One or more example embodiments provide methods, apparatuses and non-transitory computer-readable mediums for building a network control plane, configuring and/or controlling a network.

At least one example embodiment provides a method comprising: generating a reduced size textual network log by substituting a set of numerical values for a log entry within a textual network log for a network, the log entry constituting an instance of a recognizable pattern within the textual network log; and outputting the reduced size textual network log to a network controller for configuring the network.

At least one example embodiment provides a method comprising: generating a reduced size textual network log by including a set of numerical values for a log entry within a textual network log for a network, the log entry constituting an instance of a recognizable pattern within the textual network log; and outputting the reduced size textual network log to a network controller for configuring the network.

At least one other example embodiment provides a non-transitory computer-readable storage medium including computer-readable instructions that, when executed at by a processor at a network node, cause the network node to perform a method comprising: generating a reduced size textual network log by including a set of numerical values for a log entry within a textual network log for a network, the log entry constituting an instance of a recognizable pattern within the textual network log; and outputting the reduced size textual network log to a network controller for configuring the network.

At least one other example embodiment provides a non-transitory computer-readable storage medium including computer-readable instructions that, when executed at by a processor at a network node, cause the network node to perform a method comprising: generating a reduced size textual network log by substituting a set of numerical values for a log entry within a textual network log for a network, the log entry constituting an instance of a recognizable pattern within the textual network log; and outputting the reduced size textual network log to a network controller for configuring the network.

According to one or more example embodiments, the method may further include identifying, within the textual network log, the log entry based on one or more configuration parameters from the network controller.

The including may include substituting the set of numerical values for the log entry within the textual network log for the network.

The method may further include parsing, based on one or more configuration parameters from the network controller, the textual network log to identify the log entry constituting the instance of the recognizable pattern.

The substituting may further include replacing the log entry with the set of numerical values within the textual network log, each numerical value in the set of numerical values indicative of a number of characters in a respective line of text of the log entry.

The set of numerical values may be in the form of a data series.

The set of numerical values may include at least one range of values indicative of a range of a number of characters in a line of text of the log entry.

The recognizable pattern may be a sequence of character lengths for consecutive lines of text in the textual network log.

At least one other example embodiment provides a network node comprising: means for generating a reduced size textual network log by including and/or substituting a set of numerical values for a log entry within a textual network log for a network, the log entry constituting an instance of a recognizable pattern within the textual network log; and means for outputting the reduced size textual network log to a network controller for configuring the network.

At least one other example embodiment provides a network node comprising at least one processor and at least one memory including computer program code. The at least one memory and the computer program code are configured to, with the at least one processor, cause the network node to: generate a reduced size textual network log by including a set of numerical values for a log entry within a textual network log for a network, the log entry constituting an instance of a recognizable pattern within the textual network log; and output the reduced size textual network log to a network controller for configuring the network.

At least one other example embodiment provides a network node comprising at least one processor and at least one memory including computer program code. The at least one memory and the computer program code are configured to, with the at least one processor, cause the network node to: generate a reduced size textual network log by substituting a set of numerical values for a log entry within a textual network log for a network, the log entry constituting an instance of a recognizable pattern within the textual network log; and output the reduced size textual network log to a network controller for configuring the network.

The including may include substituting the set of numerical values for the log entry within the textual network log for the network.

According to at least some example embodiments, the at least one memory and the computer program code may be configured to, with the at least one processor, cause the network node to identify, within the textual network log, the log entry based on one or more configuration parameters from the network controller.

The at least one memory and the computer program code may be configured to, with the at least one processor, cause the network node to parse, based on one or more configuration parameters from the network controller, the textual network log to identify the log entry constituting the instance of the recognizable pattern.

The at least one memory and the computer program code may be configured to, with the at least one processor, cause the network node to replace the log entry with the set of numerical values within the textual network log. Each numerical value in the set of numerical values may be indicative of a number of characters in a respective line of text of the log entry.

The set of numerical values may be in the form of a data series.

The set of numerical values may include at least one range of values indicative of a range of a number of characters in a line of text of the log entry.

The recognizable pattern may be a sequence of character lengths for consecutive lines of text in the textual network log.

At least one other example embodiment provides a network controller comprising: means for interpreting, based on one or more configuration parameters, a reduced size textual network log from a network node, the reduced size textual network log including one or more sets of numerical values representing one or more log entries within a larger textual network log for the network node; and means for configuring the network node based on the interpreted reduced size textual network log.

At least one other example embodiment provides a network controller comprising at least one processor and at least one memory including computer program code. The at least one memory and the computer program code are configured to, with the at least one processor, cause the network controller to: interpret, based on one or more configuration parameters, a reduced size textual network log from a network node, the reduced size textual network log including one or more sets of numerical values representing one or more log entries within a larger textual network log for the network node; and configure the network node based on the interpreted reduced size textual network log.

According to at least some example embodiments, the reduced size textual network log may include a set of numerical values in place of each of the one or more log entries, and each of the one or more sets of numerical values is indicative of a number of characters in each line of text of a respective log entry among the one or more log entries.

At least one of the one or more sets of numerical values includes a range of values for the number of characters in a line of text of a respective log entry.

The at least one memory and the computer program code may be configured to, with the at least one processor, cause the network controller to interpret the reduced size textual network log without conversion into the larger textual network log.

The at least one memory and the computer program code may be configured to, with the at least one processor, cause the network controller to: generate network configuration parameters based on the interpreted reduced size textual network log; and configure the network node based on the network configuration parameters.

Each of the one or more sets of numerical values may be in the form of a data series.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
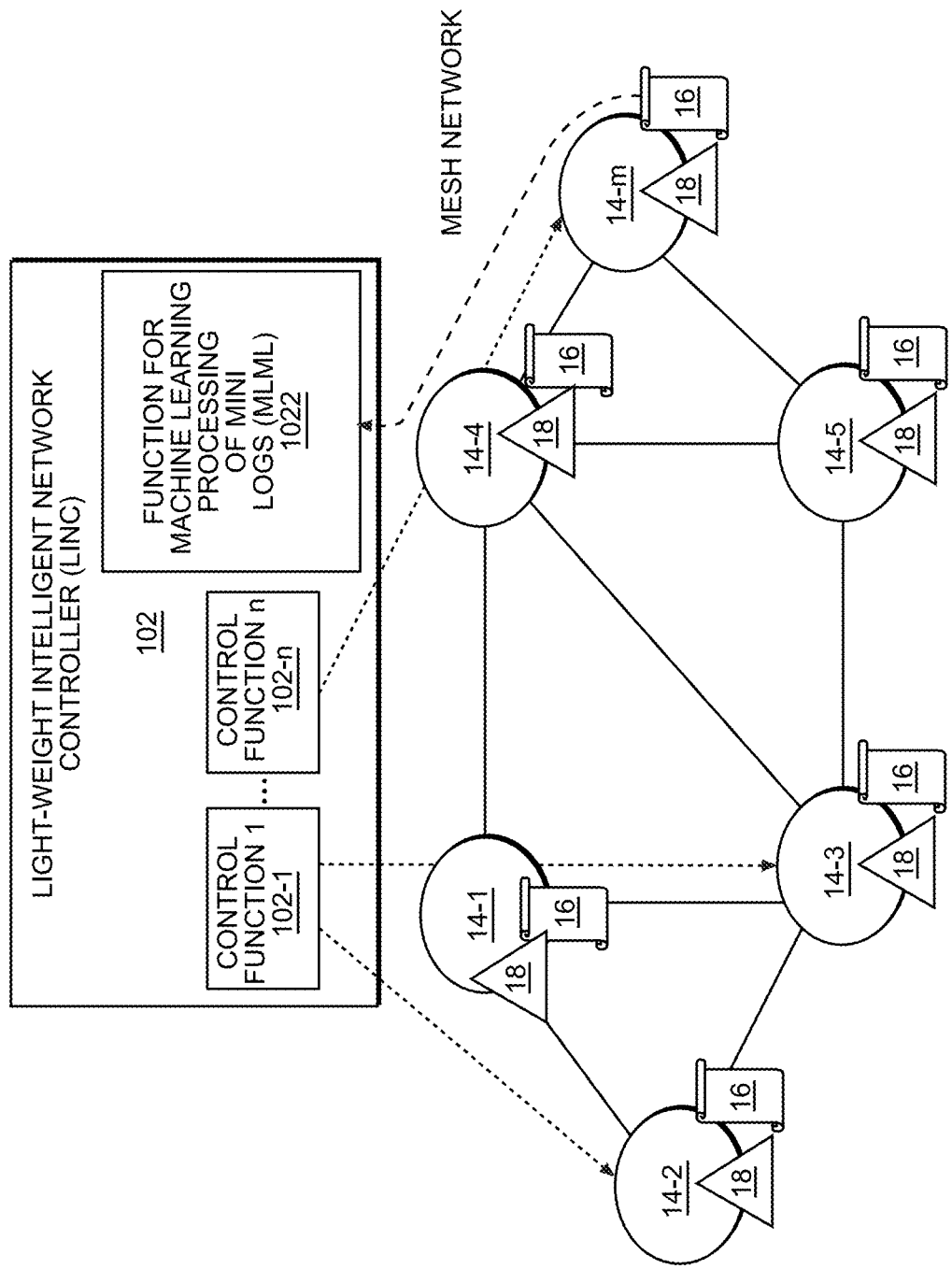
FIG. 1 illustrates a control plane architecture according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Network logs are available at network nodes and may be sent to a network controller for processing and analysis. However, conventional network logs are relatively large in size, and conventional network log analysis techniques are not adapted for control plane operation in latency-sensitive 5th Generation (5G) edge-cloud technology. Additionally, network log analysis techniques may be relatively computation intensive.

One or more example embodiments provide a pattern-based mini-log creation method for distributed network log size reduction and/or distributed control plane architecture for using mini-logs to build an intelligent light-weight control plane.

One or more example embodiments may reduce network log size, which may reduce latency, storage and/or processing requirements of a network control plane.

One or more example embodiments may also enable the creation of scalable, intelligent and/or light-weight control plane, with applications in 5G telecommunications systems.

One or more example embodiments are based on the observation that textual network logs have different repetitive patterns, each of which is indicative of particular feedback information from a network node. According to one or more example embodiments, instances of patterns may be identified and substituted with one or more numerical values to generate mini-logs (also referred to herein as reduced size network logs or reduced size textual network logs). The mini-logs may be 98-99% smaller than the larger, conventional network logs.

According to at least one example embodiment, a network node may transform a network log into a mini-log using a data series transformation. The most general data series example is "time-series" data. However, example embodiments may utilize what is referred to as "event-order series" because multiple events may occur concurrently or simultaneously. As a result, a network node may transform the lines of code (of an event record) having the pattern to one or more numerical values event-by-event according to the order of events in the network log.

Furthermore, network logs are initially available locally and not at the network controller. Thus, according to one or more example embodiments network logs are processed to generate mini-logs locally at the network node to enable the creation of a more efficient "light-weight" control plane and/or conserve bandwidth in the network.

As discussed in more detail later, according to at least one example embodiment, a network log may be transformed into a mini-log by pre-processing the network log (e.g., sampling, denoising, etc.) and then processing/transforming the network log according to one or more algorithms (algorithm can be single or mixed), such as a data series transformation.

One or more example embodiments discussed herein may be performed iteratively.

As discussed herein, a pattern refers to log entry or entries (lines of code) having an identifiable format and/or text. In one example, a pattern may refer to a sequence of integer character counts for a plurality of consecutive lines of code in a textual network log.

FIG. 1 illustrates an intelligent light-weight control plane architecture according to example embodiments.

Referring to FIG. 1, the control plane architecture includes light-weight intelligent network controller (LINC) 102 and a plurality of network nodes 14-1, 14-2, 14-3, 14-4, 14-5, . . . , 14-m.

The LINC 102 is a logically centralized network controller including functionality for machine learning processing of mini logs (MLML) 1022 in addition to functionality of conventional network controllers. The LINC 102 also includes control functions 102-1, . . . 102-n.

The MLML 1022 may be implemented in hardware and/or software at the LINC 102. As discussed later, the MLML 1022 may update parameters for one or more of one or more control functions 102-1, . . . , 102-n based on mini-logs 16 from network nodes 14-1, 14-2, . . . , 14-m, which may improve the control functions 102-1, . . . 102-n present at the LINC 102.

The MLML 1022 receives the mini-logs 16 from one or more of the network nodes 14-1, 14-2, . . . , 14-m and enables intelligent use of information provided by the mini-logs 16 to, for example, update parameters for the control functions 102-1, . . . , 102-n.

Control functions 102-1, . . . 102-n may assist with, for example, traffic classification, routing optimization, Quality of Service (QoS)/Quality of Experience (QoE) prediction, resource management and security, or the like. The control functions 102-1, . . . , 102-n may send new or updated configuration parameters to a set of the network nodes 14-1, . . . , 14-m. The set of network nodes may execute the actions requested by the LINC 102, which may result in creation of new or updated network logs.

Each of the network nodes 14-1, 14-2, 14-3, 14-4, 14-5, . . . , 14-m includes a function for local processing of logs (FLPL) 18.

The FLPL 18 may be implemented in hardware and/or software at a network node. The FLPL 18 processes network logs (e.g., by applying pattern-based reduction algorithms) to generate mini-logs, and sends the mini-logs to the MLML 1022 at the LINC 102. The FLPL 18 may also include a database of network logs generated at the network node, and a data structure (e.g., a look up table (LUT)) storing configuration parameters received from the LINC 102 (e.g., during one or more LINC cycles).

According to one or more example embodiments, the textual network logs are text files and may be archived by "zipping" old(er) logs. A database is not required for log processing, however, the log processing framework (e.g., ELK stack) may be an independent system, which may collect the network logs from different nodes and process the collected network logs them in a centralized way for more advanced log processing (e.g., indexing logs, map reducing, storing in databases, etc.).

A similar principle applies with regard to processing of mini-logs. The FLPL 18 may convert the textual network logs to numeric values, and then send the mini-logs to the control plane (e.g., LINC 102). The control plane may provide the mini-log processing functions such as pattern searching, machine learning, storing in databases, etc. In this case, the FLPL 18 need not include a database.

The MLML 1022 reads the mini-logs and applies machine learning techniques to the mini-logs to generate conclusions. The MLML 1022 (or LINC 102) informs the control functions 102-1, . . . , 102-n about the machine learning conclusions. The control functions 102-1, . . . , 102-n make further decisions regarding the network nodes based on the conclusions.

Figure 2:
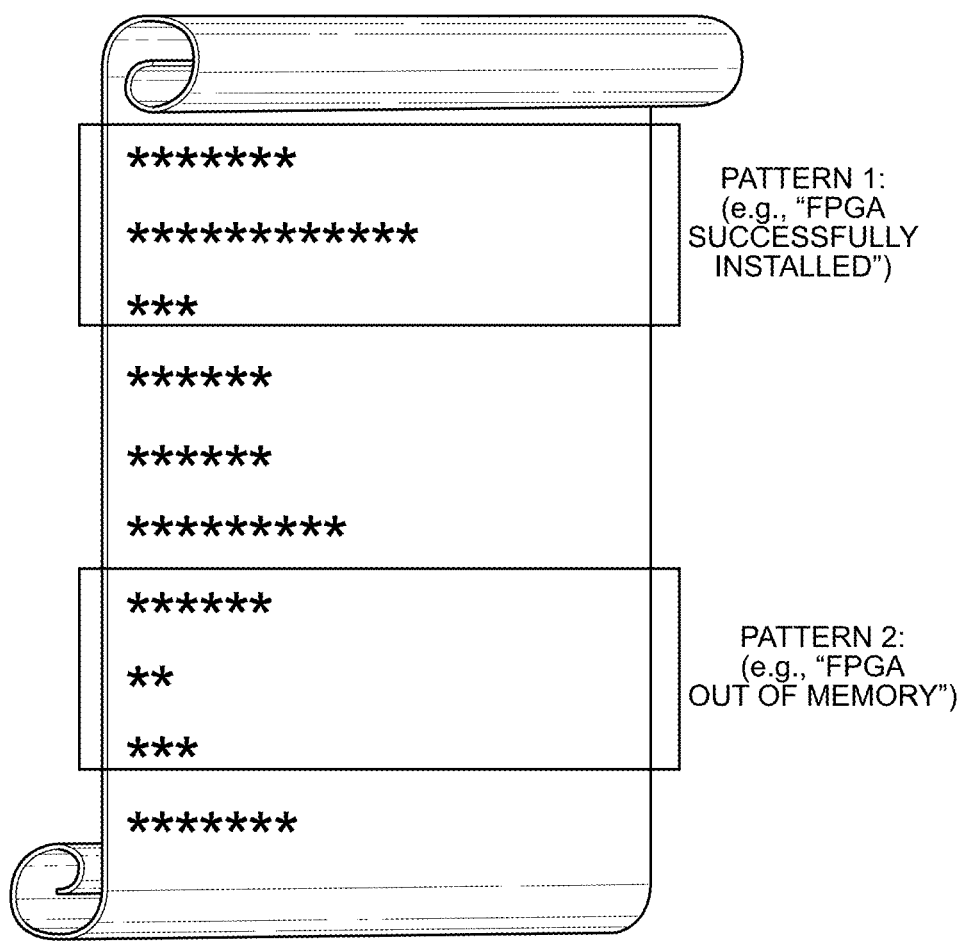
FIG. 2 illustrates a network log to assist in explaining example embodiments.

FIG. 2 illustrates a network log to assist in explaining example embodiments.

Referring to FIG. 2, a network log may include millions of lines of code. As mentioned above, within the lines of code in the network log, different repetitive patterns are indicative of particular feedback information from the network node. This feedback information is also referred to as event records or events. The event records may include network functions such as an indication that a FPGA is successfully installed, a FPGA is out of memory, etc. As discussed in more detail below, the FLPL 18 may parse the network logs to identify identified patterns within the network log, and replace the identified patterns with one or more numerical values (e.g., on an event-by-event basis) to reduce the size of the network logs and generate the mini-logs.

Network log entries generally follow the format of Log Head+Log Body.

The Log Head has the format of timestamp, hostname, module name, line number and log level. An example of a portion of a Log Head in OpenStack is shown below.

mai 29 00:00:00 nuc4 neutron-openvswitch-agent[4878]: DEBUG . . .

In this example, mai 29 00:00:00 is the timestamp, nuc4 is the hostname, neutron-openvswitch-agent is the module name, [4878] is the line number of the network log, and DEBUG is the log level.

The Log Body includes message text with variable parameters.

The variables identify the event (e.g., PID, uuid, amount, etc.). Despite the fact that variable length may change, the message text on a given line of the Log Body still falls within a threshold range. The difference in length caused by variables may be considered as "variance" according to one or more example embodiments. As discussed in more detail later, in the case of message text with variance for a given line, the length may be represented by a range of values.

An example of a uuid line of the Log Body is shown below.

mai 29 00:00:00 nuc4 neutron-openvswitch-agent[4878]:
        <uuid>6ece0ff6-33c3-43e0-8f93-bbf02740c0da</uuid>

In this example, uuid is a variable, but the length of this entry is the same in this OpenStack example regardless of the value of the individual characters.

An example of a line of the Log Body including instance name is shown below. In this example, the instance name is a variable with a length that may vary. Thus, this line may have "variance," and be represented by a range of values.

mai 29 00:00:00 nuc4 neutron-openvswitch-agent[4878]:
        <name>instance-0000006c</name>

The above-noted example is provided for example purposes. However, example embodiments should not be limited to this specific example. The network log format implementation may differ for different network log framework and configuration. For example, the hostname, module name or line numbers may all be configurable. The control plane may be aware of the format of the network logs and may adapt the corresponding pattern to process the mini-logs.

Figure 3:
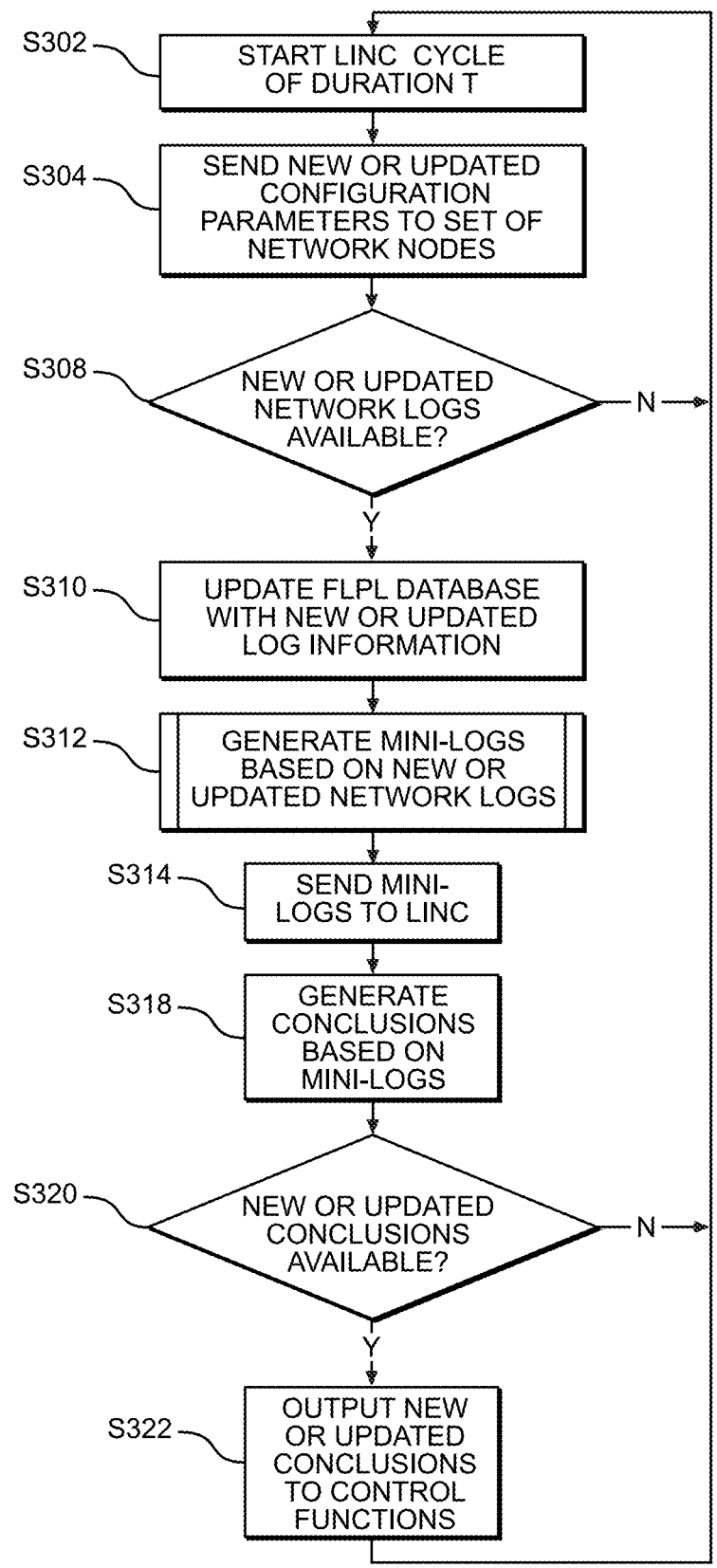
FIG. 3 is a flow chart illustrating a method according to example embodiments.

FIG. 3 is a flow chart illustrating a method according to example embodiments. The method shown in FIG. 3 will be discussed with regard to the architecture shown in FIG. 1 for example purposes. In so doing, the example embodiment shown in FIG. 3 will be discussed with regard to the LINC 102 and the network node 14-1. However, example embodiments should not be limited to this example. Rather, the method shown in FIG. 3 may be performed with regard to a set of network nodes, wherein the set of network nodes may include any number of network nodes.

The example embodiment shown in FIG. 3 will, in most cases, be described with regard to operations performed by the FLPL 18 and the MLML 1022. However, example embodiments should not be limited to this example. Rather, example embodiments may also be described with regard to the functions performed by the LINC 102 and the network node 14-1.

For simplicity, the example embodiment shown in FIG. 3 will be discussed with regard to a single network log and generating a mini-log based on the network log. However, example embodiments should not be limited to this example. Rather, the method shown in FIG. 3 may be applied to any number of network logs.

Referring to FIG. 3, at the start of a LINC cycle of duration T (step S302), the LINC 102 sends new or updated configuration parameters to the network node 14-1 at step S304.

The LINC cycle duration T is the execution time for generating and analyzing one or more mini-logs. The duration T may be determined by the LINC 102 depending on requirements from subscribed (or deployed) control functions (e.g., control functions 102-1, . . . , 102-$n$) as well as the network nodes (e.g., in communication with the LINC 102). In one example, for 5th Generation (5G) Radio Access Networks (RANs), the duration T may be within the scheduling period (e.g., about 1 ms).

The configuration parameters are parameters for configuring the FLPL 18 to generate mini-logs. In one example, the configuration parameters configure the FLPL 18 with typical patterns within the network log and the corresponding numerical value(s) to be substituted (e.g., written or entered in place of) for the pattern in the network log. For example, the configuration parameters may include an identifiable format for a given event record in the form of an ordered pattern of one or more numerical values. The ordered pattern corresponds to ordered character counts of lines (e.g., consecutive lines) of code within the network log. In at least some example embodiments, the ordered pattern may correspond to ordered character counts of lines of code constituting an event record.

For example, a pattern Pattern_X for an event record Event_X may be associated with an ordered pattern [$x_1$, $x_2$, $x_3$, . . . $x_N$], wherein N is number of values in the pattern and corresponds to the number of (consecutive) lines of code in the pattern Pattern_X. Each value in the pattern (or data series) represents an integer character count of a respective line (e.g., first line, second line, third line, . . . , Nth line) of the pattern.

In a more specific example, a pattern for an event record having 5 lines without variance may be [94, 75, 69, 59, 55], wherein each number in the pattern represents a character count of a respective line of the event record.

As mentioned above, character counts for lines of an event record may be arranged as a pattern with or without variance. In an example with variance, a pattern for an event record having N lines of code may be [($y_1$, $z_1$), [$y_2$, $z_2$), ($y_3$, $z_3$), . . . , ($y_N$, $z_N$)]. Each set of numbers in parentheses represents a range of integer or decimal values for the character count in the respective line.

In a more specific example with variance, a pattern for an event record having 5 lines of code with variance may be [(79, 108), [63, 86), (58, 79), (50, 67), (46, 63)]. In this instance, the pattern indicates that the first line of code has a character count between 79 and 108, the second line of code has a character count between 63 and 86, and so on.

The configuration parameters may also instruct the FLPL 18 with regard to how to update the local database (e.g., frequency of updates, etc.) at the FLPL 18. In one example, the configuration parameters may be provided in the form of, and stored at the network node 14-1 as, one or more LUTs. The configuration parameters may also be stored at the LINC 102 in one or more LUTs. The configuration parameters may include (i) patterns (or data series) or (ii) patterns and their associated event records, which may be stored at the FLPL 18.

Still referring to FIG. 3, in response to receiving the configuration parameters, at step S308 the network node 14-1 determines whether there are any new or updated network logs available. As discussed above, when the control functions 102-1, . . . , 102-$n$ send new or updated configuration parameters to a set of the network nodes 14-1, . . . , 14-$m$, the set of network nodes may execute the requested actions, which may result in creation of new or updated network logs. Thus, the network node 14-1 may have new or updated network logs available after having received and executed actions requested by the control functions 102-1, . . . , 102-$n$.

If there are no new or updated network logs available, then the process returns to step S302 and continues as discussed herein for the next LINC cycle.

Returning to step S308, if one or more new or updated network logs are available at the network node 14-1, then at step S310 the network node 14-1 updates the FLPL database with the new network log information.

At step S312, the FLPL 18 at the network node 14-1 generates a mini-log based on the new or updated network log and the configuration parameters received from the MLML 1022. As discussed in more detail below, the FLPL 18 may generate the mini-log by identifying instances of one or more patterns within the network log and replacing the identified patterns with the one or more numerical values (e.g., in the ordered data series) included in the configuration parameters.

Figure 4:
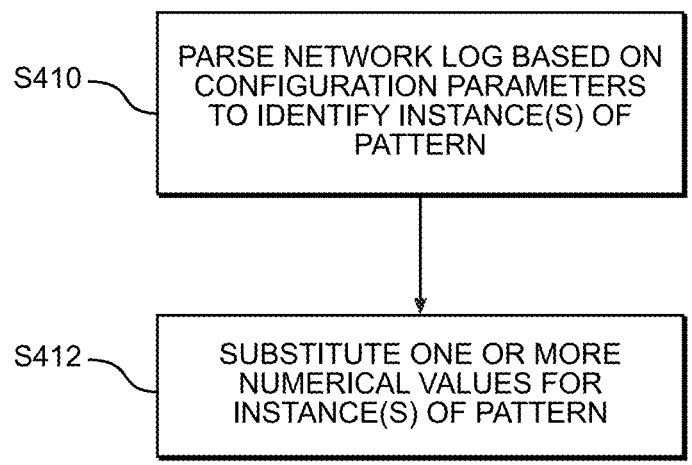
FIG. 4 is a flow chart illustrating another method according to example embodiments.

FIG. 4 is a flow chart illustrating a method for generating mini-logs according to example embodiments. The example embodiment shown in FIG. 4 will be described with regard to instances of a single pattern without variance for example purposes. However, example embodiments should not be limited to this example. Rather, the FLPL 18 may parse any number of network logs to identify instances of any number of patterns with or without variance concurrently or simultaneously.

Referring to FIG. 4, at step S410, the FLPL 18 parses the network log to identify instances of the pattern in the network log based on the configuration parameters provided at step S304.

Referring back to the above-discussed example in which the pattern is [94, 75, 69, 59, 55], in this example the FLPL 18 parses the network log to identify instances of consecutive lines of code (e.g., constituting an event record) in the network log having the respective values in the order noted in the pattern.

Once the FLPL 18 identifies instances of the pattern, at step S412 the FLPL 18 replaces or substitutes the consecutive lines of code having the pattern of numerical values with the one or more numerical values in the pattern (as identified in the configuration parameters sent at step S304) in the network log.

In the example discussed above with regard to step S410, once the FLPL 18 identifies instances of the pattern, at step S412 the FLPL 18 replaces or substitutes the numerical values [94, 75, 69, 59, 55] for the corresponding lines of code constituting the instances of the pattern.

The steps shown in FIG. 4 may be performed iteratively, concurrently or simultaneously to replace each instance of each provided pattern in the network log to generate the mini-log.

At step S314, the network node 14-1 sends the generated mini-log to the LINC 102 (e.g., using control signaling).

At step S318, the MLML 1022 generates conclusions based on the received mini-logs.

According to one or more example embodiments, the MLML 1022 does not convert the mini-logs back to the original, textual network logs. Rather, the MLML 1022 interprets or deciphers the mini-logs, and the substituted numerical values included therein, based on the configuration parameters, which are known at the MLML 1022, to identify the corresponding event record, which may be used to generate the conclusions. Thus, the MLML 1022 may generate the conclusions directly from the mini-logs without conversion.

According to one or more example embodiments, the MLML 1022 may generate the conclusions by applying machine learning techniques based on the content of the mini-logs.

According to one or more example embodiments, when the MLML 1022 receives the mini-logs from the FLPL 18, the MLML 1022 begins a machine learning approach to log analytics, including supervised or unsupervised learning. For example, the MLML 1022 may utilize the data series pattern to label the mini-logs. Once the mini-logs are labeled, the MLML 1022 may construct a mini-log classifier. The MLML 1022 may perform classification in any suitable manner (e.g., Support Vector Machines (SVM), Random Forests, etc.). Once the classifier is trained, the MLML 1022 may predict one or more events and/or generate one or more conclusions based on the trained classifier and the most recent mini-logs sent by the FLPL 18.

The conclusions may include new parameters used to improve and/or optimize the control functions at the LINC 102 (e.g., new flow rules for improving Quality of Service (QoS) and/or Quality of Experience (QoE) for users connected to the network. In another example, for mobile networks, the conclusions may include various radio configurations, resource allocation decisions, configuration related to network slicing, etc.

At step S320, the MLML 1022 determines whether new or updated conclusions are available. In the case of new or updated parameters for the control functions 102-1, . . . , 102-*n* at the LINC 102, for example, the MLML 1022 may determine whether new or updated conclusions are available based on a comparison between current parameters and parameters generated at step S318.

If new or updated conclusions are not available, then the process returns to step S302 and continues as discussed herein.

Returning to step S320, if new or updated conclusions are available, then at step S322 the MLML 1022 outputs the new or updated conclusions to the respective control functions 102-1, . . . 102-*n* and/or network nodes 14-1, . . . , 14-*m* as needed, for configuring or controlling the network. The control functions 102-1, . . . , 102-*n* and/or the network nodes, 14-1, . . . , 14-*m* may then configure and/or control the network accordingly in any suitable manner.

The process then returns to step S302 and continues as discussed herein.

Figure 5:
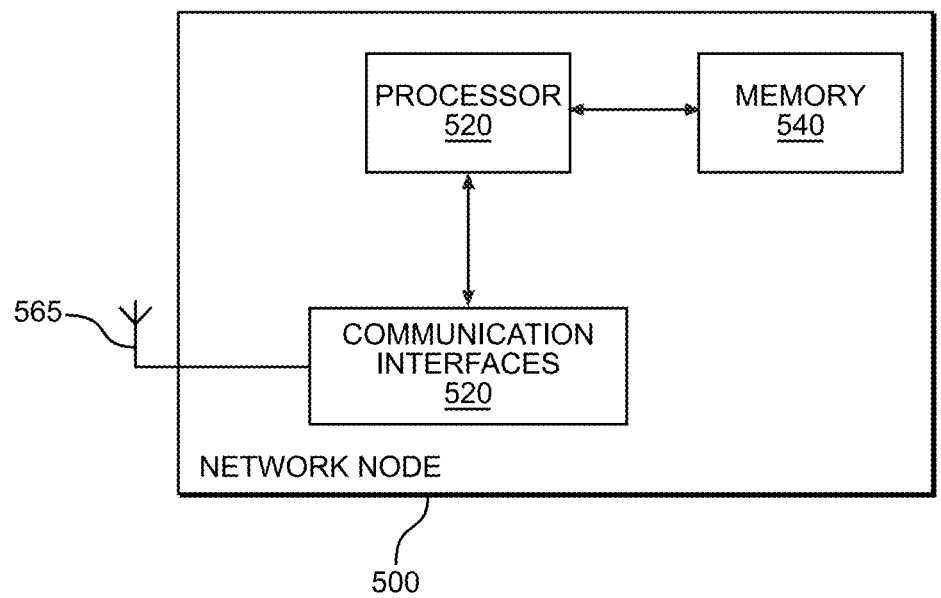
FIG. 5 illustrates a network node according to example embodiments.

FIG. 5 illustrates an example embodiment of a network node. The network node shown in FIG. 5 may serve as one or more of the network nodes 14-1, . . . , 14-*m* shown in FIG. 1. The network node may also be referred to as a network apparatus or network device. Although discussed with regard to a network node, the structure shown in FIG. 5 may also serve as the LINC 102.

As shown, the network node 500 includes: a memory 540; a processor 520 connected to the memory 540; various interfaces 560 connected to the processor 520; and one or more antennas or antenna panels 565 connected to the various interfaces 560. The various interfaces 560 and/or the antenna 565 may constitute a transceiver for transmitting/receiving data from/to other network nodes and/or LANs via a wired or wireless links. As will be appreciated, depending on the implementation of the network node 500, the network node 500 may include many more components than those shown in FIG. 5. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network node 500 (e.g., functionalities of a network node, such as a server, a router, a switch, component or element of a 5th Generation telecommunications network, etc., methods according to the example embodiments, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, or other input/output components. As will be understood, the various interfaces 560 and programs stored in the memory 540 to set forth the special purpose functionalities of the network node 500 will vary depending on the implementation of the network node 500.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, network controllers, network apparatuses, elements or entities including routers, switches, components or elements of 5th Generation telecommunications networks, cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network node, network controller, network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, network controllers, network apparatuses, elements or entities including routers, switches, components or elements of 5th Generation telecommunications networks, cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method comprising:
generating a reduced size network log by
parsing, based on one or more configuration parameters, a network log to identify one or more instances of patterns in a log entry within the network log for a network, the one or more configuration parameters including an identifiable format for an event record in the form of an ordered pattern of one or more numerical values, the event record including a network function,
substituting the one or more numerical values for the one or more instances of patterns in the log entry, and
generating the reduced sized network log based on the network log with the one or more numerical values substituted for the one or more instances of patterns in the log entry; and
outputting the reduced size network log to a network controller for configuring the network.

2. The method of claim 1, further comprising:
identifying, within the network log, the log entry based on the one or more configuration parameters from the network controller.

3. The method of claim 1, wherein
each numerical value in the one or more numerical values is indicative of a number of characters in a respective line of text of the log entry.

4. The method of claim 1, wherein the one or more numerical values is a set of numerical values in a form of a data series.

5. The method of claim 1, wherein the one or more numerical values includes at least one range of values indicative of a range of a number of characters in a line of text of the log entry.

6. The method of claim 1, wherein a recognizable pattern among the one or more instances of patterns is a sequence of character lengths for consecutive lines of text in the network log.

7. A network node comprising:
at least one processor; and
at least one memory including computer program code, the at least one memory and the computer program code configured to, with the at least one processor, cause the network node to
parse, based on one or more configuration parameters, a network log to identify one or more instances of patterns in a log entry within the network log for a network, the one or more configuration parameters including an identifiable format for an event record in the form of an ordered pattern of one or more numerical values, the event record including a network function,
substitute the one or more numerical values for the one or more instances of patterns in the log entry,
generate a reduced sized network log based on the network log with the one or more numerical values substituted for the one or more instances of patterns in the log entry, and
output the reduced size network log to a network controller for configuring the network.

8. The network node of claim 7, wherein the at least one memory and the computer program code are configured to, with the at least one processor, cause the network node to identify, within the network log, the log entry based on the one or more configuration parameters from the network controller.

9. The network node of claim 7, wherein the at least one memory and the computer program code are configured to, with the at least one processor, cause the network node to substitute the one or more numerical values for the log entry within the network log for the network.

10. The network node of claim 7, wherein each numerical value in the one or more numerical values is indicative of a number of characters in a respective line of text of the log entry.

11. The network node of claim 7, wherein the one or more numerical values is a set of numerical values in a form of a data series.

12. The network node of claim 7, wherein the one or more numerical values includes at least one range of values indicative of a range of a number of characters in a line of text of the log entry.

13. The network node of claim 7, wherein the one or more instances of patterns include a recognizable pattern, the recognizable pattern being a sequence of character lengths for consecutive lines of text in the network log.

14. A network controller comprising:
   at least one processor; and
   at least one memory including computer program code, the at least one memory and the computer program code configured to, with the at least one processor, cause the network controller to
      interpret, based on one or more configuration parameters, a reduced size network log from a network node, the reduced size network log including one or more numerical values having been substituted for one or more log entries within a larger network log for the network node, and the one or more configuration parameters including the one or more numerical values and the one or more log entries, the one or more configuration parameters including an identifiable format for an event record in the form of an ordered pattern of the one or more numerical values, the event record including a network function; and
      configure the network node based on the interpreted reduced size network log.

15. The network controller of claim 14, wherein
   each of the one or more numerical values having been substituted for a number of characters in each line of text of a respective log entry among the one or more log entries.

16. The network controller of claim 15, wherein at least one of the one or more numerical values includes a range of values for the number of characters in a line of text of a respective log entry.

17. The network controller of claim 14, wherein the at least one memory and the computer program code are configured to, with the at least one processor, cause the network controller to interpret the reduced size network log without conversion into the larger network log.

* * * * *